(12) United States Patent
Barish et al.

(10) Patent No.: US 11,763,439 B2
(45) Date of Patent: Sep. 19, 2023

(54) SYSTEMS AND METHODS FOR ASSESSING TRAILER UTILIZATION

(71) Applicant: ZEBRA TECHNOLOGIES CORPORATION, Lincolnshire, IL (US)

(72) Inventors: Justin F. Barish, Kings Park, NY (US); Seth David Silk, Barrington, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 122 days.

(21) Appl. No.: 17/510,973

(22) Filed: Oct. 26, 2021

(65) Prior Publication Data

US 2023/0128009 A1    Apr. 27, 2023

(51) Int. Cl.
| | |
|---|---|
| *G06T 7/11* | (2017.01) |
| *G06T 17/00* | (2006.01) |
| *G06T 7/00* | (2017.01) |
| *G06T 7/50* | (2017.01) |
| *G06Q 50/28* | (2012.01) |
| *G06Q 10/067* | (2023.01) |
| *G06T 7/60* | (2017.01) |

(52) U.S. Cl.
CPC ......... *G06T 7/0002* (2013.01); *G06Q 10/067* (2013.01); *G06Q 50/28* (2013.01); *G06T 7/11* (2017.01); *G06T 7/50* (2017.01); *G06T 7/60* (2013.01); *G06T 17/00* (2013.01); *G06T 2200/04* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 11,030,730 B2* | 6/2021 | Benson | ............ G06T 7/13 |
| 11,299,219 B2* | 4/2022 | Raasch | ............ G01S 17/87 |
| 2016/0047646 A1 | 2/2016 | Ochsendorf et al. | |
| 2019/0197701 A1* | 6/2019 | Krishnamurthy | .... H04N 13/204 |
| 2019/0355144 A1* | 11/2019 | Korobov | ............ G06T 7/11 |
| 2021/0264630 A1 | 8/2021 | Krishnamurthy et al. | |

OTHER PUBLICATIONS

International Search Report and Written Opinion for International Application No. PCT/US2022/040548 dated Nov. 14, 2022.

\* cited by examiner

*Primary Examiner* — Saptarshi Mazumder

(57) ABSTRACT

Methods for assessing trailer utilization are disclosed herein. An example method includes capturing an image featuring a trailer, and segmenting the image into a plurality of regions. For each region the example method may include cropping the image to exclude data that exceeds a respective forward distance threshold, and iterating over each data point to determine whether or not a matching point is included. Responsive to whether or not a matching point included for a respective data point, the method may include adding the respective data point or the matching point to a respective region based on a position of the respective data point. Further, the method may include calculating a normalized height of the respective region based on whether or not a gap is present in the respective region; and creating a 3D model visualization of the trailer that depicts trailer utilization.

20 Claims, 8 Drawing Sheets

SYSTEMS AND METHODS FOR ASSESSING TRAILER UTILIZATION

BACKGROUND

In the commercial freight industry, Time of Flight (ToF) sensors are frequently used to analyze the interior of freight containers using three-dimensional (3D) and two-dimensional (2D) image data. As part of this analysis, the image data captured by ToF sensors is typically used to calculate load metrics associated with the freight containers that indicate, for example, the container utilization at a given time during the loading/unloading process. Errors in these loading metrics can cause extensive problems for shippers and customers as the containers may be inefficiently loaded, and as a result, shipments may be delayed.

Accordingly, a major point of emphasis in the commercial freight industry is accurately and reliably performing trailer interior analytics to calculate load metrics, such as trailer utilization. Making these calculations are a substantial challenge for traditional systems as traditional systems cannot calculate trailer utilization when the freight loaded onto a trailer is arranged chaotically and is non-uniform in shape/size.

Thus, there is a need for systems and methods that accurately and reliably assess trailer utilization in all loading/unloading conditions.

SUMMARY

In an embodiment, the present invention is a method for assessing trailer utilization. The method includes capturing an image featuring a trailer, wherein the image includes a plurality of three-dimensional (3D) image data; segmenting the image into a plurality of regions; for each region of the plurality of regions: cropping the image to exclude 3D image data that exceeds a respective forward distance threshold corresponding to a respective region, iterating, using a utilization algorithm, over each 3D image data point of the cropped image to determine whether or not a matching point is included for each 3D image data point of the cropped image, responsive to determining that a matching point is not included for a respective 3D image data point of the cropped image, adding the respective 3D image data point to the respective region, responsive to determining that a matching point is included for a respective 3D image data point of the cropped image, adding the respective 3D image data point or the matching point to the respective region based on a position of the respective 3D image data point, calculating a normalized height of the respective region based on whether or not a gap is present in the respective region; and creating a 3D model visualization of the trailer that depicts trailer utilization based on the 3D image data included in each respective region and the normalized height of each respective region.

In a variation of this embodiment, each region of the plurality of regions is defined by a length of the trailer divided by an average box depth loaded within the trailer.

In another variation of this embodiment, the utilization algorithm is a K-nearest neighbor searching algorithm.

In yet another variation of this embodiment, and responsive to determining that a matching point is included for a respective 3D image data point of the cropped image, the method further comprises determining (i) whether or not the respective 3D image data point of the cropped image is further forward than the matching point and (ii) a distance of the respective 3D image data point from a front depth of the respective region; responsive to determining that the respective 3D image data point of the cropped image is further forward than the matching point, adding the matching point to the respective region; and responsive to determining that (i) the respective 3D image data point of the cropped image is not further forward than the matching point and (ii) the distance of the respective 3D image data point does not exceed a front depth distance threshold, adding the respective 3D image data point to the respective region.

In still another variation of this embodiment, the method further comprises: responsive to determining that the respective 3D image data point of the cropped image is further forward than the matching point: determining (i) whether or not the respective 3D image data point includes a depth coordinate less than the front depth of the respective region and (ii) whether or not the depth coordinate of the respective 3D image data point added to an average box depth loaded within the trailer is greater than the front depth of the respective region; and responsive to determining that the depth coordinate is less than the front depth and that the depth coordinate added to the average box depth is greater than the front depth of the respective region, designating the depth coordinate of the respective 3D image data point as equivalent to the front depth of the respective region.

In yet another variation of this embodiment, the method further comprises: calculating the normalized height of the respective region by: segmenting the respective region into a plurality of horizontal sections that each have a respective horizontal section height, wherein each gap present in the respective region has a respective gap dimension; subtracting each respective gap dimension that corresponds to a respective gap included within a respective horizontal section from the corresponding respective horizontal section height to calculate a normalized horizontal section height; and adding each normalized horizontal section height corresponding to a respective region together to calculate the normalized height of the respective region.

In still another variation of this embodiment, the method further comprises: displaying, on a user interface, the 3D model visualization of the trailer for a user, wherein the 3D model visualization of the trailer includes a graphical rendering indicating a region within the trailer that has a corresponding trailer utilization that does not satisfy a trailer utilization threshold.

In another embodiment, the present invention is a system for assessing trailer utilization. The system includes a housing; an imaging assembly at least partially within the housing and configured to capture an image featuring a trailer, wherein the image includes a plurality of three-dimensional (3D) image data; one or more processors; and a non-transitory computer-readable memory coupled to the imaging assembly and the one or more processors. The memory stores instructions thereon that, when executed by the one or more processors, cause the one or more processors to: segment the image into a plurality of regions; for each region of the plurality of regions: crop the image to exclude 3D image data that exceeds a respective forward distance threshold corresponding to a respective region, iterate, using a utilization algorithm, over each 3D image data point of the cropped image to determine whether or not a matching point is included for each 3D image data point of the cropped image, responsive to determining that a matching point is not included for a respective 3D image data point of the cropped image, add the respective 3D image data point to the respective region, responsive to determining that a matching point is included for a respective 3D image data point of the cropped image, add the respective 3D image data point or the matching point to the respective region based on a position of the respective 3D image data point, calculate a normalized height of the respective region based on whether or not a gap is present in the respective region, and create a 3D model visualization of the trailer that depicts trailer utilization based on the 3D image data included in each respective region and the normalized height of each respective region.

In a variation of this embodiment, each region of the plurality of regions is defined by a length of the trailer divided by an average box depth loaded within the trailer.

In another variation of this embodiment, the utilization algorithm is a K-nearest neighbor searching algorithm.

In yet another variation of this embodiment, the instructions, when executed, further cause the one or more processors to: responsive to determining that a matching point is included for a respective 3D image data point of the cropped image: determine (i) whether or not the respective 3D image data point of the cropped image is further forward than the matching point and (ii) a distance of the respective 3D image data point from a front depth of the respective region, responsive to determining that the respective 3D image data point of the cropped image is further forward than the matching point, add the matching point to the respective region, and responsive to determining that (i) the respective 3D image data point of the cropped image is not further forward than the matching point and (ii) the distance of the respective 3D image data point does not exceed a front depth distance threshold, add the respective 3D image data point to the respective region.

In still another variation of this embodiment, the instructions, when executed, further cause the one or more processors to: responsive to determining that the respective 3D image data point of the cropped image is further forward than the matching point: determine (i) whether or not the respective 3D image data point includes a depth coordinate less than the front depth of the respective region and (ii) whether or not the depth coordinate of the respective 3D image data point added to an average box depth loaded within the trailer is greater than the front depth of the respective region, and responsive to determining that the depth coordinate is less than the front depth and that the depth coordinate added to the average box depth is greater than the front depth of the respective region, designate the depth coordinate of the respective 3D image data point as equivalent to the front depth of the respective region.

In yet another variation of this embodiment, the instructions, when executed, further cause the one or more processors to: calculate the normalized height of the respective region by: segmenting the respective region into a plurality of horizontal sections that each have a respective horizontal section height, wherein each gap present in the respective region has a respective gap dimension, subtracting each respective gap dimension that corresponds to a respective gap included within a respective horizontal section from the corresponding respective horizontal section height to calculate a normalized horizontal section height, and adding each normalized horizontal section height corresponding to a respective region together to calculate the normalized height of the respective region.

In still another variation of this embodiment, the instructions, when executed, further cause the one or more processors to: cause a user interface to display the 3D model visualization of the trailer for a user, wherein the 3D model visualization of the trailer includes a graphical rendering indicating a region within the trailer that has a corresponding trailer utilization that does not satisfy a trailer utilization threshold.

In yet another embodiment, the present invention is a tangible machine-readable medium comprising instructions for assessing trailer utilization that, when executed, cause a machine to at least: capture an image featuring a trailer, wherein the image includes a plurality of three-dimensional (3D) image data; segment the image into a plurality of regions; for each region of the plurality of regions: crop the image to exclude 3D image data that exceeds a respective forward distance threshold corresponding to a respective region, iterate, using a utilization algorithm, over each 3D image data point of the cropped image to determine whether or not a matching point is included for each 3D image data point of the cropped image, responsive to determining that a matching point is not included for a respective 3D image data point of the cropped image, add the respective 3D image data point to the respective region, responsive to determining that a matching point is included for a respective 3D image data point of the cropped image, add the respective 3D image data point or the matching point to the respective region based on a position of the respective 3D image data point, calculate a normalized height of the respective region based on whether or not a gap is present in the respective region; and create a 3D model visualization of the trailer that depicts trailer utilization based on the 3D image data included in each respective region and the normalized height of each respective region.

In a variation of this embodiment, each region of the plurality of regions is defined by a length of the trailer divided by an average box depth loaded within the trailer, and the utilization algorithm is a K-nearest neighbor searching algorithm.

In another variation of this embodiment, the instructions, when executed, further cause the machine to at least: responsive to determining that a matching point is included for a respective 3D image data point of the cropped image: determine (i) whether or not the respective 3D image data point of the cropped image is further forward than the matching point and (ii) a distance of the respective 3D image data point from a front depth of the respective region, responsive to determining that the respective 3D image data point of the cropped image is further forward than the matching point, add the matching point to the respective region, and responsive to determining that (i) the respective 3D image data point of the cropped image is not further forward than the matching point and (ii) the distance of the respective 3D image data point does not exceed a front depth distance threshold, add the respective 3D image data point to the respective region.

In yet another variation of this embodiment, the instructions, when executed, further cause the machine to at least: responsive to determining that the respective 3D image data point of the cropped image is further forward than the matching point: determine (i) whether or not the respective 3D image data point includes a depth coordinate less than the front depth of the respective region and (ii) whether or not the depth coordinate of the respective 3D image data point added to an average box depth loaded within the trailer is greater than the front depth of the respective region, and responsive to determining that the depth coordinate is less than the front depth and that the depth coordinate added to the average box depth is greater than the front depth of the respective region, designate the depth coordinate of the respective 3D image data point as equivalent to the front depth of the respective region.

In still another variation of this embodiment, the instructions, when executed, further cause the machine to at least: calculate the normalized height of the respective region by: segmenting the respective region into a plurality of horizontal sections that each have a respective horizontal section height, wherein each gap present in the respective region has a respective gap dimension, subtracting each respective gap dimension that corresponds to a respective gap included within a respective horizontal section from the corresponding respective horizontal section height to calculate a normalized horizontal section height, and adding each normalized horizontal section height corresponding to a respective region together to calculate the normalized height of the respective region.

In yet another variation of this embodiment, the instructions, when executed, further cause the machine to at least: cause a user interface to display the 3D model visualization of the trailer for a user, wherein the 3D model visualization of the trailer includes a graphical rendering indicating a region within the trailer that has a corresponding trailer utilization that does not satisfy a trailer utilization threshold.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
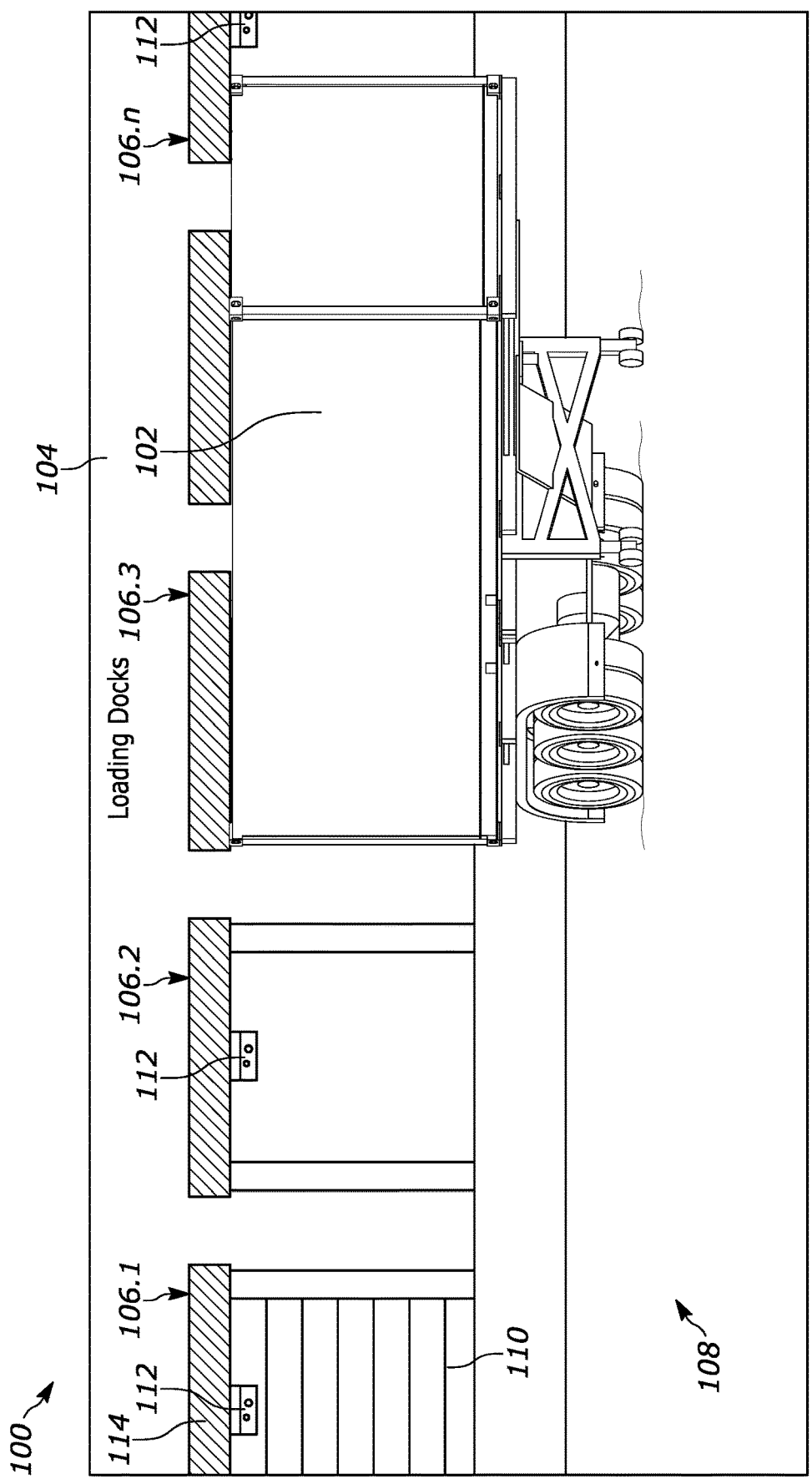
FIG. 1A illustrates a load facility, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, freight carrier companies seek to accurately and efficiently analyze the load status of each container for which they are responsible. These companies may incorporate imaging systems to provide this analysis (e.g., load monitoring units (LMUs)). However, these traditional imaging systems suffer from a number of drawbacks, such as being unable to effectively determine trailer utilization in a wide variety of circumstances.

Consequently, the methods/systems of the present disclosure provide solutions to the trailer utilization determination problems associated with the traditional imaging systems. Namely, a method of the present disclosure may generally partition a trailer into fixed regions which can be further subdivided into segments to show height variations across a given region of the trailer. The segments are formed by subdividing each region, and the height of each segment may be determined from the point cloud region slice. The regions and segments may be used to calculate trailer utilization and to visualize related metrics in a user interface (UI) for post processing by a user. In this manner, the techniques of the present disclosure improve over conventional techniques by providing a uniform method to determine trailer utilization information corresponding to both homogenous cargo loads and mixed cargo loads during both outbound and inbound workflows.

FIG. 1A illustrates an exemplary environment where embodiments of the present invention may be implemented. In the present example, the environment is provided in a form of a loading dock 100 (also referenced herein as a "load facility") where trailers (also referenced herein as "containers") 102 are loaded or unloaded with various goods and/or where various goods are unloaded from the containers 102. The load dock 100 is comprised of a facility 104 having a plurality of load bays 106.1-106.n facing a load facility lot 108 where vehicles, such as semi-trucks (not shown), deliver and pick up trailers 102. To be loaded or unloaded, each trailer 102 is backed in toward the facility 104 such that it is generally perpendicular with the wall having the plurality of loading bays 106.1-106.n, and in line with one of the loading bays (in this case 106.3). As illustrated, each respective load bay of the plurality of load bays 106.1-106.n includes a bay door 110 that can be lowered to close the respective load bay or raised to open the respective load bay allowing the interior of the facility 104 to be accessible there through. Additionally, each respective loading bay is provided with a respective LMU 112. The respective LMU 112 is mounted near the trailer 102 loading area, preferably in the upper section of the respective loading bay outside the door 110 facing the load facility lot 108 or an interior/rear of a trailer 102 if one is docked at the respective load bay. To protect the respective LMU 112 from inclement weather, it could be mounted under a bay awning 114. Once docked, freight can be loaded onto/unloaded from the trailer 102 with the respective LMU 112 maintaining a view of the rear/inside of the trailer 102.

Figure 1B:
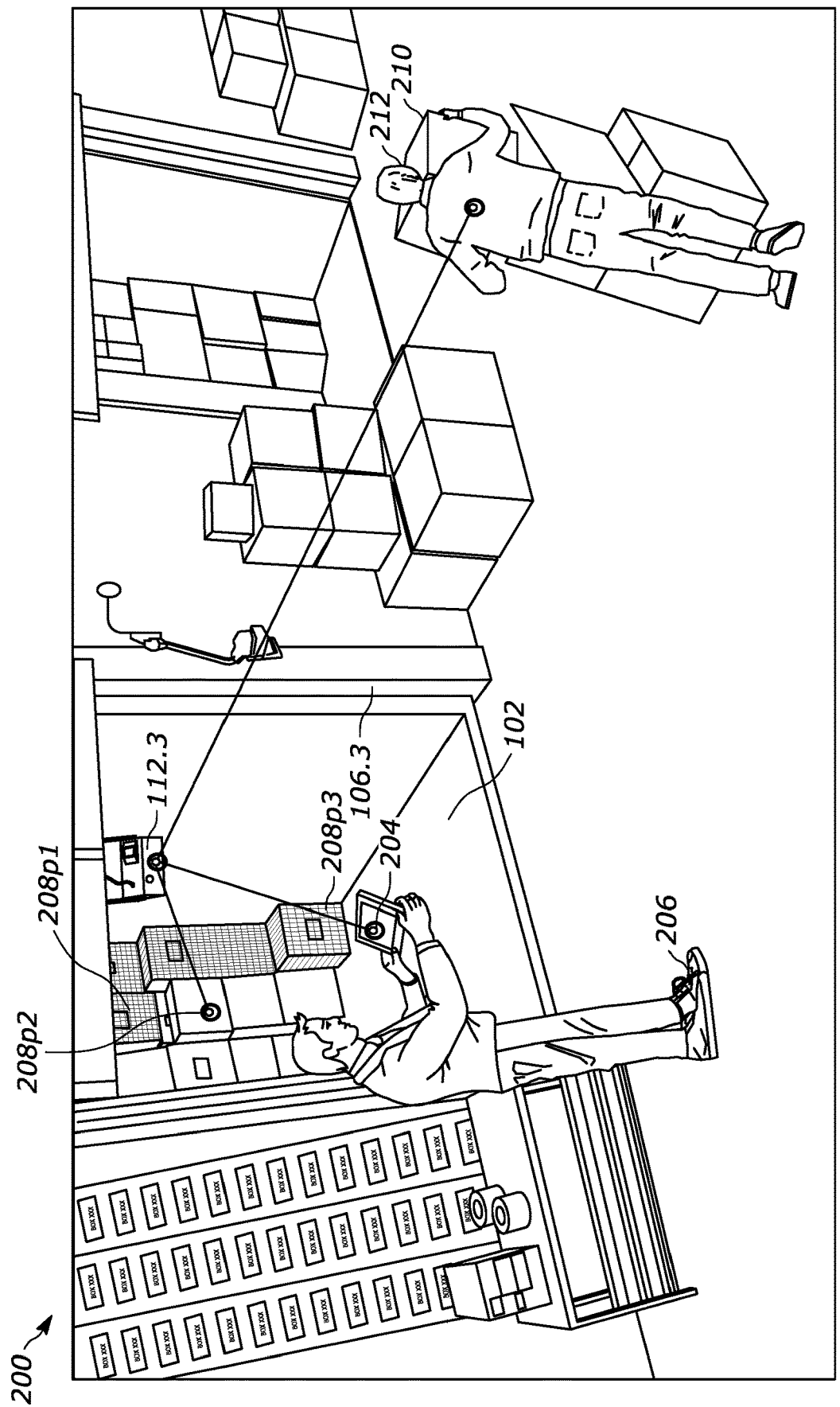
FIG. 1B illustrates an interior of the load facility of FIG. 1A.

FIG. 1B is a perspective view 200 of the load facility 100 of FIG. 1A depicting trailer 102 docked at a load bay 106.3, in accordance with example embodiments herein. For example, FIG. 1B depicts trailer 102, which in the embodiment of FIG. 1B is an interior view of the trailer 102 of FIG. 1A. FIG. 1B also depicts load bay 106.3, which in the embodiment of FIG. 1B is an interior view of the load bay 106.3 of FIG. 1A. As depicted in FIG. 1B, trailer 102 is docked with load bay 106.3 exposing the interior of trailer 102 to the interior of load facility 100. Trailer 102 includes packages, boxes, and/or other transportable objects or goods, including packages 208p1-208p3. The packages 208p1-208p3 may be in a state of being loaded or unloaded into trailer 102. For example, worker 212 may be in a state of loading or unloading additional packages 210 into or out of trailer 102. In some embodiments, manager 206 may oversee, assist, or otherwise additionally facilitate the loading or unloading packages, boxes, and/or other transportable objects or goods (e.g., packages 208p1-208p3 or 210) into or out of the trailer 102. For example, manager 206 may utilize a dashboard app executing on client device 204 as described herein.

FIG. 1B also depicts a LMU 112.3. LMU 112.3 may include one or more processors and one or more computer memories for storing image data, and/or for executing apps that perform analytics or other functions as described herein. In various embodiments, and as shown in FIG. 1B, the LMU 112.3 may be mounted within loading facility 100 and oriented in the direction of trailer 102 to capture 3D and/or 2D image data of the interior of trailer 102. For example, as shown in FIG. 1B, LMU 112.3 may be oriented such that the 3D and 2D cameras of LMU 112.3 look down the length of the trailer 102 so that LMU 112.3 may scan or sense the walls, floor, ceiling, packages (e.g., 208p1-208p3 or 210), or other objects or surfaces with trailer 102 to determine the 3D and 2D image data. The image data may be processed by the one or more processors and/or memories of the LMU 112.3 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the LMU 112.3 may process the 3D and 2D image data, as scanned or sensed from the 3D-depth camera and photo-realistic camera, for use by other devices (e.g., client device 204). For example, the one or more processors and/or one or more memories of the LMU 112.3 may process the image data scanned or sensed from trailer 102. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server for storage or for further manipulation.

As shown in FIG. 1B, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p-208p3 or 210), as described herein. In some embodiments, the dashboard app may receive the image data and/or the post-scanning data and display such data in real-time. Client device 204 may be a mobile device, such as a tablet, smartphone, laptop, or other such mobile computing device. Client device 204 may also include wired or wireless transceivers for receiving image data and/or post-scanning data as described herein. Such wired or wireless transceivers may implement one or more communication protocol standards including, for example, TCP/IP, Wi-Fi (802.11b), Bluetooth, or any other similar communication protocols or standards.

In some embodiments, the image data and/or the post-scanning data may be sent to a server. In such embodiments, the server may generate post-scanning data, that may include metadata, simplified data, normalized data, result data, status data, or alert data as determined from the original scanned or sensed image data provided by the LMU 112.3. As described herein, the server may store such data, and may also send the image data and/or the post-scanning data to a dashboard app, or other app, implemented on a client device, such as the dashboard app implemented on client device 204 of FIG. 16.

Figure 1D:
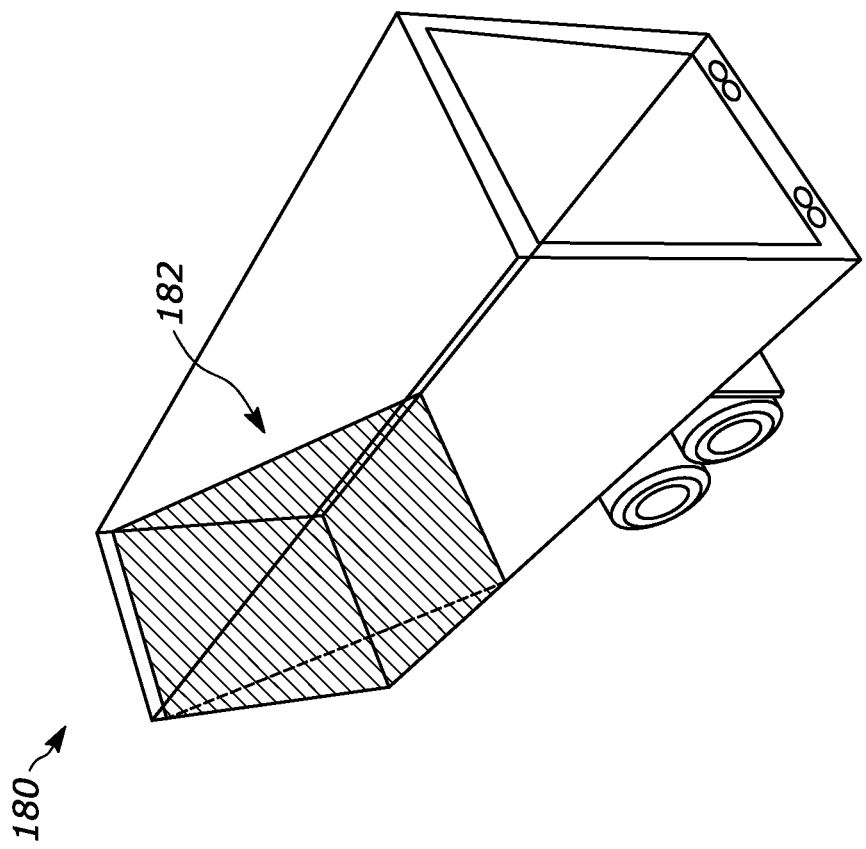
FIG. 1D illustrates another interior loading/unloading arrangement of the trailer of FIG. 1A, in accordance with embodiments described herein.
Figure 1C:
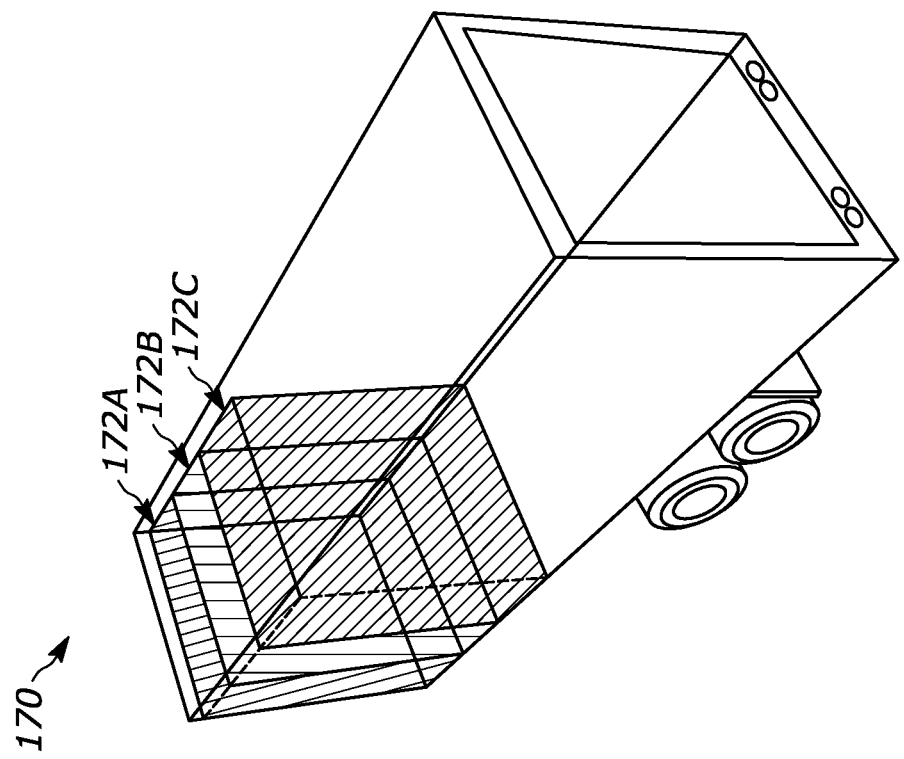
FIG. 1C illustrates an interior loading/unloading arrangement of the trailer of FIG. 1A, in accordance with embodiments described herein.

FIG. 1C illustrates an interior loading/unloading arrangement 170 of the trailer (e.g., trailer 102) of FIG. 1A, in accordance with embodiments described herein. As previously mentioned, loading freight (e.g. packages, boxes, etc.) onto trailers constrained in time can be chaotic and unorganized, especially when the individual pieces of freight are not cuboidal in shape and vary greatly in size. However, when the majority of items are cuboidal in shape and similar in size, packing can generally be loaded in a fashion similar to erecting a brick wall, as depicted in FIG. 1C.

In particular, as illustrated in FIG. 1C, the interior loading/unloading arrangement 170 includes three freight walls 172A-C (also referenced herein as "package walls"). Workers (e.g., worker 212) may systematically place each individual box along the trailer floor until a complete row of boxes at a particular height is formed. The workers may then proceed to stack another complete row of boxes on top of the previous row, thereby creating a freight wall, until the freight wall reaches the trailer ceiling, at which point the workers may proceed to create a new freight wall by placing boxes on the trailer floor in front of the prior freight wall. The workers may iteratively continue this freight wall loading process until the workers either exhaust the number of boxes/packages waiting to be loaded onto the trailer, and/or the freight walls reach the front edge of the trailer (e.g., near the trailer door).

In practice, such a freight wall loading process may result in non-optimal trailer utilization because freight dimensions may not allow the workers to consistently build freight walls that are flush with either the trailer walls and/or the trailer ceiling, resulting in non-utilized trailer space. Additionally, individual freight dimensions may necessitate that workers create and/or leave gaps in between boxes within a freight wall that are never filled, such that the freight walls themselves include non-utilized trailer space. However, these space utilization issues are not unique to the freight wall loading strategy.

For example, FIG. 1D illustrates another interior loading/unloading arrangement 180 of the trailer (e.g., trailer 102) of FIG. 1A, in accordance with embodiments described herein, that suffers from non-utilized trailer space. More specifically, as illustrated in FIG. 1D, the freight 182 is not loaded in a wall-type construction, and is more chaotic in arrangement similar to pilling freight in an avalanche fashion that is comprised of items that vary greatly in size and shape. The workers (e.g., worker 212) may simply place each item of freight in the trailer in a pile starting from the trailer floor at the back wall. The pile of freight may grow in height and depth until it reaches a shape similar to the freight 182, and the workers may continue to grow the pile until the front edge of the pile reaches the trailer front edge. Thereafter, the workers may continue to place freight on the pile to fill any remaining space within the trailer until the pile can no longer support additional freight without falling out of the trailer. This avalanche loading style typically results in large portions of unused space within a trailer, as the pile generally does not reach the trailer ceiling because the unorganized pile cannot support freight at that height without tumbling to the pile's leading edge.

Thus, these loading methods illustrated in FIGS. 1C and 1D can often result in non-utilized space within a loaded trailer, and this non-utilized space is difficult for conventional systems to identify, particularly when the non-utilized space is obscured from an LMU's field of view (FOV). However, as described herein, the systems and methods of the present disclosure overcome these limitations of conventional systems by, inter alia, actively tracking and updating the non-utilized space within a trailer regardless of whether or not the non-utilized space remains unobscured from the LMU's FOV. A critical component of these systems and methods is the LMU, as illustrated in FIG. 2.

Figure 2:
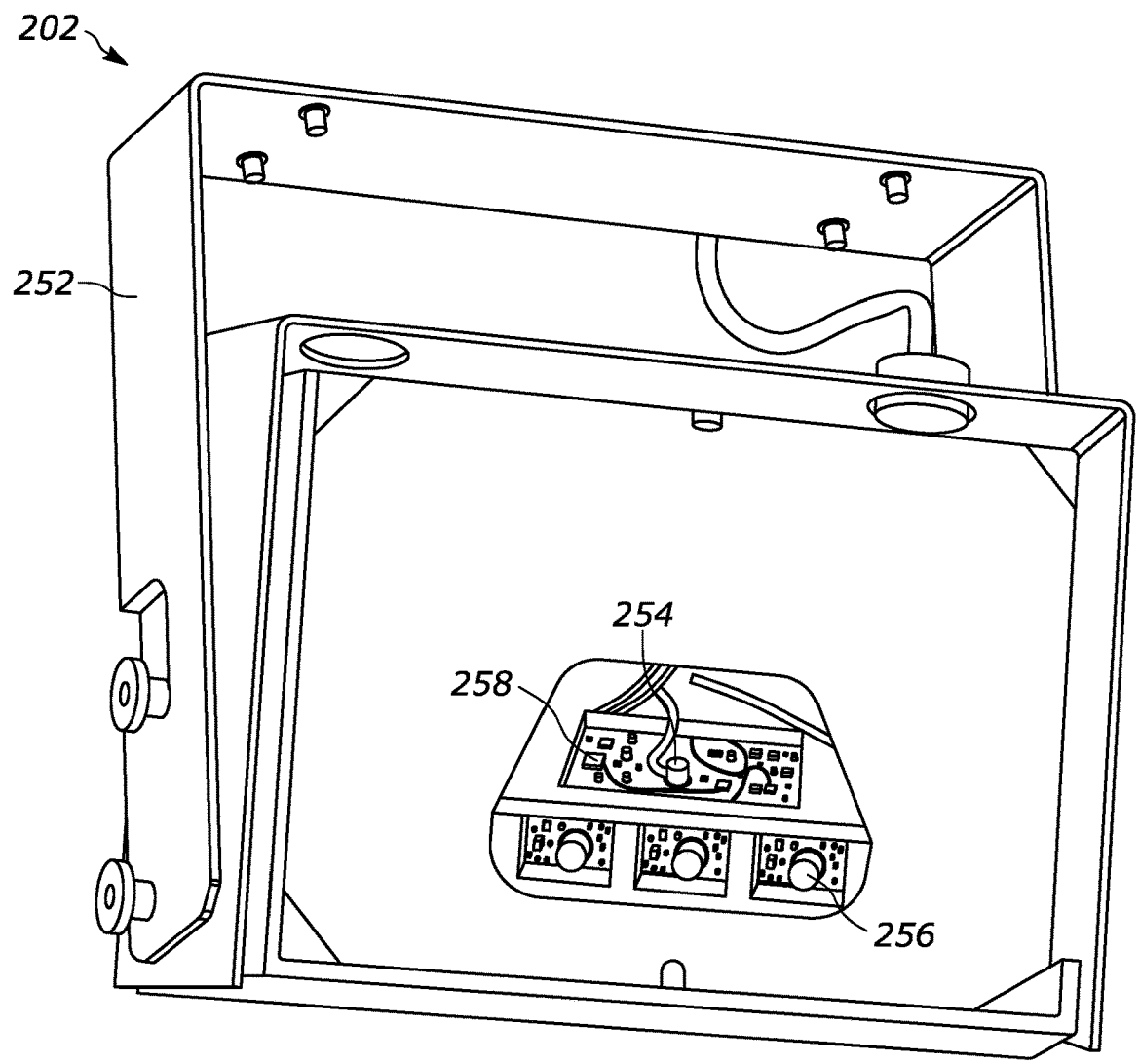
FIG. 2 illustrates a load monitoring unit (LMU), in accordance with embodiments described herein.

FIG. 2 illustrates a load monitoring unit (LMU), in accordance with embodiments described herein. As shown in FIG. 2, the LMU 202 is a mountable device that includes a mounting bracket 252 for orienting or otherwise positioning the LMU 202 within a load facility (e.g., load facility 100). The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices.

LMU 202 may include a 3D camera 254 (also referenced herein as a "Time-of-Flight (ToF) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., load bay 106.3) or objects within the predefined search area, such as boxes or packages (e.g., packages 208p-208p3) and trailer 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D camera 254, for example, the trailer 102 and any objects, areas, or surfaces therein. The 3D camera 254 may also be configured to capture other sets of image data in addition to the 3D image data, such as grayscale image data, ambient image data, amplitude image data, and/or any other suitable image data or combination thereof.

LMU 202 may further include a photo-realistic camera 256 for capturing, sensing, or scanning 2D image data. The photo-realistic camera 256 may be a RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. Consequently, the captured 2D images and the corresponding 2D image data may be depth-aligned with the 3D images and 3D image data.

LMU 202 may also include a processing board 258 configured to, for example, perform trailer utilization estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

Figure 3:
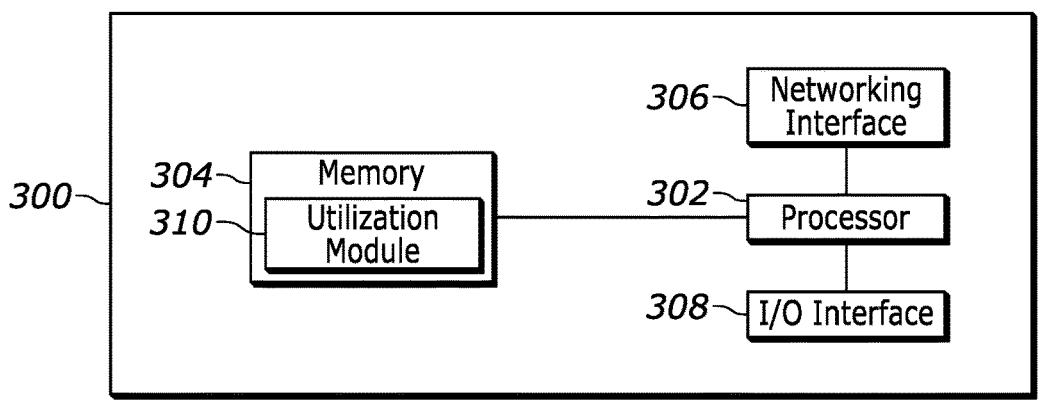
FIG. 3 is a block diagram of an example logic circuit for implementing example methods and/or operations described herein.

FIG. 3 is a block diagram representative of an example logic circuit capable of implementing, for example, one or more components of the example processing board 258 of FIG. 2 or, more generally, the example LMU 202 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. The memory 304 also includes a utilization module 310 that is accessible by the example processor 302. The utilization module 310 may comprise rule-based instructions, an artificial intelligence (AI) and/or machine learning-based model, and/or any other suitable algorithm architecture or combination thereof configured to, for example, perform trailer utilization analysis using content captured by the TMU 202. To illustrate, the example processor 302 may access the memory 304 to execute the utilization module 310 when the TMU 200 captures an image that features a trailer.

Additionally, or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a networking interface 306 to enable communication with other machines via, for example, one or more networks. The example networking interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 308 to enable receipt of user input and communication of output data to the user. Such user input and communication may include, for example, any number of keyboards, mice, USB drives, optical drives, screens, touchscreens, etc.

Figure 4:
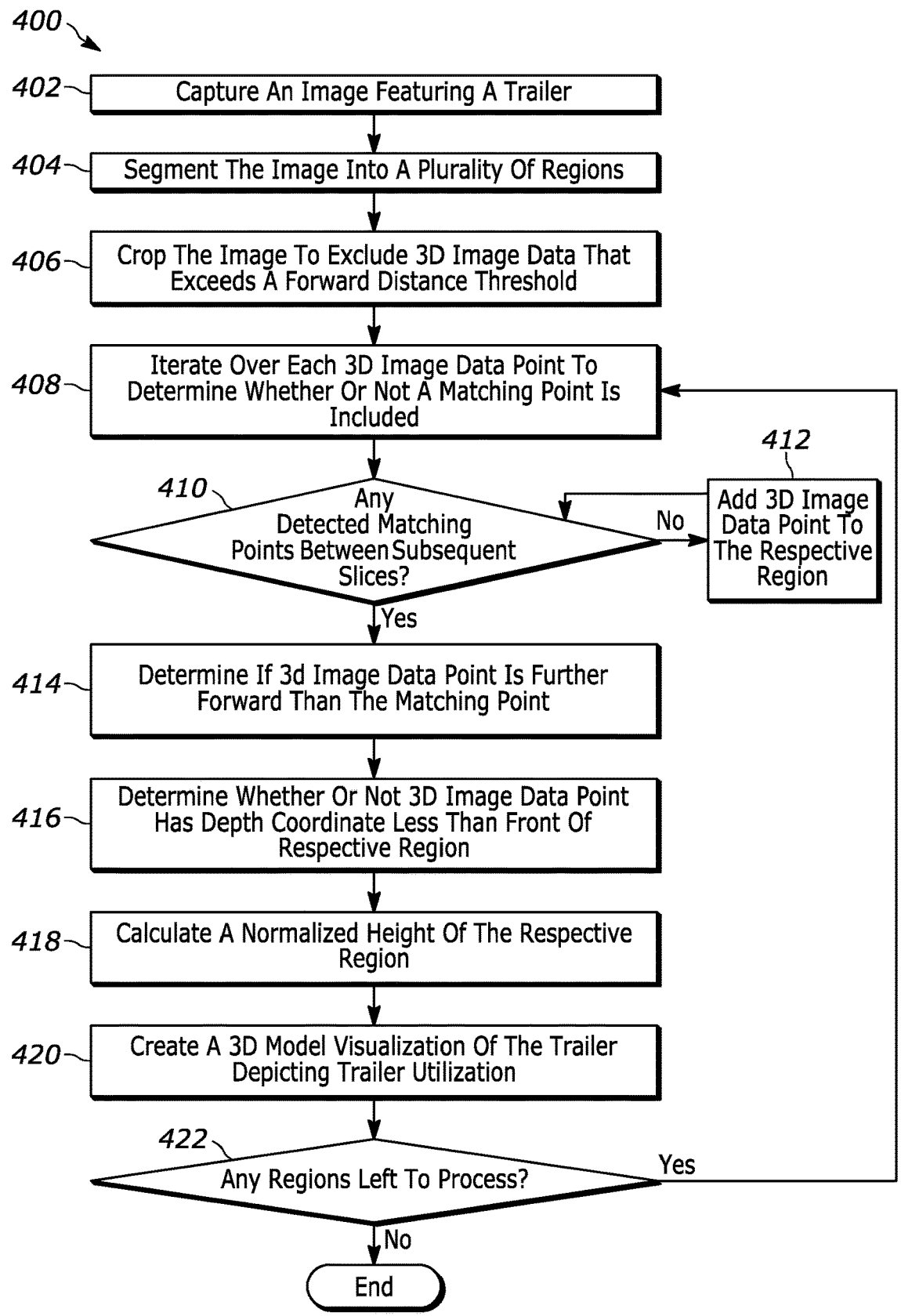
FIG. 4 is a flowchart representative of a method for assessing trailer utilization, in accordance with embodiments described herein.

FIG. 4 is a flowchart representative of a method 400 for assessing trailer utilization, in accordance with embodiments described herein. The method 400 describes a variety of embodiments, and several specific embodiments are described in reference to FIGS. 5, 6A, 6B, and 6C. It should be appreciated that any of the actions described herein with respect to the method 400 may be performed by any suitable component, such as the processors 302 utilizing executable instructions stored in the memory 304 (e.g., utilization module 310), and/or any other components or combinations thereof. Moreover, it is important to note that the actions described herein with respect to the method 400 may be performed iteratively during the loading/unloading of a trailer in order to capture image data corresponding to the respective regions of the trailer before, during, and after the workflow is completed. In this manner, the method 400 may actively calculate trailer utilization during the load process and avoid losing critical image data as a result of continued blocking of regions from the FOV of the LMU.

The method 400 includes capturing an image featuring a trailer (block 402). The image may generally be a three-dimensional (3D) image, and may include a plurality of 3D image data. For example, the 3D image data included as part of the image may include x, y coordinate position values as well as a depth value for each data point comprising the plurality of 3D image data.

The method 400 also includes segmenting the image into a plurality of regions (block 404). Generally, each region (also referenced herein as a "point cloud slice") of the plurality of regions may be of equal dimension, but any suitable dimensions for the plurality of regions may be used. In some aspects, each region of the plurality of regions is defined by a length of the trailer divided by an average box depth loaded within the trailer. For example, an average box depth may be 1 meter, and the length of a trailer may be approximately 15 meters, such that the image is segmented into 15 equally dimensioned regions.

The method 400 also includes cropping the image to exclude 3D image data that exceeds a forward distance threshold (block 406). Each respective region of the plurality of regions may have a corresponding forward distance threshold that is based on the front edge of the respective region. For example, a first respective region may extend from the back wall of the trailer to approximately 1 meter away from the back wall of the trailer (e.g., toward the front edge of the trailer's loading door), and the average box depth for freight loaded into the trailer may be 1 meter. In this example, the forward distance threshold for the first respective region may be approximately 2 meters away from the back wall of the trailer.

More specifically, each respective region of the plurality of regions may include a front depth and a back depth that define the depth coordinates within the image that correspond to the respective region. As freight is loaded into the trailer, each respective region of the plurality of regions may be loaded from back to front, such that freight first enters the respective region from the back depth of the respective region and eventually reaches the front depth of the respective region as the trailer is more fully loaded. However, freight loaded into the trailer may be larger/smaller than the average size, and as a result, freight loaded into a respective region may exceed the depth coordinate boundaries of the respective region despite being primarily located within the respective region.

For example, a box that is 1.2 meters in depth may be placed in a first respective region with a front depth and back depth differential of approximately 1 meter, such that the majority of the box is located within the respective region but 0.2 meters of the box is located within an adjacent region. In this case, if the box is included as part of the adjacent region, the approximately 1 meters of depth (and corresponding volume) within the first respective region may be presumed empty, which it is not. Thus, in order to identify all freight included as part of each respective region, the forward distance threshold may be determined by subtracting the average box depth from the front depth value of the respective region. In this manner, the freight placed within a respective region that extends beyond the front depth value of the respective region may still be included as utilized space within that respective region, and by extension, within the trailer.

The method 400 also includes iterating, using a utilization algorithm, over each 3D image data point of the cropped image to determine whether or not a matching point is included for each 3D image data point of the cropped image (block 408). Generally, the utilization algorithm (e.g., part of the utilization module 310) may check each 3D image data point included in each point cloud slice of the cropped image to determine whether or not a point that includes the same x, y coordinates and a different depth value has already been identified for the respective point cloud slice. Based on this determination, the processors may include either the 3D image data point or the matching point as part of a composite point cloud representation of the respective region that features the forward most 3D point data representing the respective region.

For example, the LMU 202 of FIG. 2 may capture the image of the trailer at a first time $T_1$, and may thereafter capture a subsequent image of the trailer at a second time $T_2$ after workers have loaded more freight into the trailer. The point cloud slice representative of a first respective region in the image captured at $T_1$ may be compared to the point cloud slice representative of the first respective region in the image captured at $T_2$ to determine whether or not matching points within the region exist. In some aspects, the utilization algorithm is a K-nearest neighbor searching algorithm. However, it should be appreciated that any suitable searching algorithm may be used.

As a result of applying the utilization algorithm, the algorithm may determine whether or not any matching points exist between subsequent slices of the same region (block 410). In the event that no matching points exist between the subsequent slices of a respective region (NO branch of block 410) (e.g., the forward most box at an x, y location of the respective region in a first slice is still the forward most box at that location in the second slice), then the 3D image data point that was previously identified as the forward most data point at a particular x, y coordinate location within the region may remain as such within the composite point cloud representation of the respective region (block 412).

However, if a matching point is identified for a particular location within a respective region between subsequent slices (YES branch of block 410), then the method 400 may also include determining whether or not the 3D image data point is further forward than the matching point (block 414). Generally, the processors may make this determination as part of a sequence of determinations (e.g., block 416) to ultimately decide whether the 3D image data point from the captured image or the matching point should be included in the composite point cloud representation of the respective region as the forward most point within the respective region at the x, y coordinates shared by the 3D image data point and the matching point.

If the 3D image data point is not further forward (e.g., further back) than the matching point, then the processors may additionally determine where the 3D image data point is relative to the front of the respective region (e.g., the front depth value). If the 3D image data point is close to the front depth value of the respective region, then the 3D image data point may be stored as the forward most point within the respective region at those x, y coordinates. The 3D image data point may be close to the front depth value of the respective region by being within one or more centimeters, inches, and/or any other suitable distance. On the other hand, if the depth value of the 3D image data point is not close (e.g., more than several centimeters, inches, etc.) to the front depth value of the respective region, then the 3D image data point may not be stored as the forward most point within the respective region at those x, y coordinates. Instead, the matching point may maintain the designation as the forward most point within the respective region at those x, y coordinates, and may remain part of the composite point cloud representation of the respective region.

In certain aspects, the processors may determine (i) whether or not the respective 3D image data point of the cropped image is further forward than the matching point and (ii) a distance of the respective 3D image data point from a front depth of the respective region. Responsive to determining that the respective 3D image data point of the cropped image is further forward than the matching point, the processors may add the matching point to the composite point cloud representation of the respective region. However, responsive to determining that (i) the respective 3D image data point of the cropped image is not further forward than the matching point and (ii) the distance of the respective 3D image data point does not exceed a front depth distance threshold, the processors may add the respective 3D image data point to the composite point cloud representation of the respective region. For example, the front depth distance threshold may be a few centimeters, inches, and/or any other suitable distance.

Alternatively, if the 3D image data point is further forward than the matching point, then the method 400 may proceed to block 416, where the method 400 includes determining whether or not the 3D image data point has a depth coordinate that is less than the front depth value of the respective region. If the 3D image data point has a depth coordinate that is less than the front depth value, then the processors may automatically add the average box depth to the depth coordinate of the 3D image data point (generating a "composite depth value") in order to determine whether or not this composite depth value for the 3D image data point exceeds the front depth value. In the event that the composite depth value exceeds the front depth value, the processors may add the 3D image data point to the composite point cloud representation of the respective region.

The composite depth value exceeding the front depth value while the 3D image data point depth coordinate does not indicates that the 3D image data point corresponds to new freight (e.g., a box) placed in front of the region that occupies space within the region as a result of the new freight's depth. Thus, the processors may determine that the space in the region behind the front face of the new freight is not empty, but is instead filled with a portion of the new freight. Accordingly, the processors may add the 3D image data point to the composite point cloud representation of the respective region, and may set the depth value corresponding to the 3D image data point to the front depth value of the respective region to indicate that the new freight fills the remaining space of the respective region between the matching point and the front of the respective region.

In some aspects, responsive to determining that the respective 3D image data point of the cropped image is further forward than the matching point, the processors may determine (i) whether or not the respective 3D image data point includes a depth coordinate less than the front depth of the respective region and (ii) whether or not the depth coordinate of the respective 3D image data point added to an average box depth loaded within the trailer is greater than the front depth of the respective region. Further in these aspects, and responsive to determining that the depth coordinate is less than the front depth and that the depth coordinate added to the average box depth is greater than the front depth of the respective region, designating the depth coordinate of the respective 3D image data point as equivalent to the front depth of the respective region when the respective 3D image data point is included as part of the composite point cloud representation of the respective region.

For example, the workers may place new freight (e.g., a box) in front of a newly filled region of freight, such that the front face of the new freight (at certain x, y coordinate values defining the front face) extends 0.4 meters beyond the front depth value of a first respective region into a second respective region. The average box depth may be 1 meter, such that the processors may determine that the composite depth value of the new freight exceeds the front depth value of the first respective region by 0.6 meters, and as a result, the processors may determine that the new freight fills in the 0.6 meters of previously empty space of the first respective region. Accordingly, the processors may set the depth value of the 3D image point data corresponding to the front face of the new freight at the front depth value of the first respective region to indicate that the new freight fills in the previously empty space, despite the front face of the new freight featuring a depth value corresponding to an adjacent region within the trailer.

Moreover, it should be appreciated that the processors may add the 3D image data point depth coordinate that represents a portion of the new freight extending into the more forward region into the composite point cloud representation of the more forward region. Continuing the above example, the new freight extends 0.4 meters into the second respective region, such that the front face of the new freight represents the furthest forward points within the second respective region at the respective x, y coordinate values corresponding to the front face of the new freight. In this example, the processors may add the 3D image data point depth coordinates corresponding to the front face of the new freight to the composite point cloud representation of the second respective region. Thus, the new freight may contribute to the composite point cloud representations of both the first respective region (e.g., where 0.6 meters of the new freight is located) and the second respective region (e.g., where 0.4 meters of the new freight is located). Thereafter, a subsequent new freight may be placed in front of the new freight, and the 3D image point data depth coordinate corresponding to the front face may be replaced for the respective x, y coordinate values corresponding to the front face where the subsequent new freight obscures the new freight front face. Additionally, or alternatively, the processors may discard the 3D image data point depth coordinates corresponding to the front face of the new freight, based on the expectation that a subsequent piece of freight will be placed within the second respective region at a depth coordinate that is more proximate to the front depth value of the second respective region.

Figure 5:
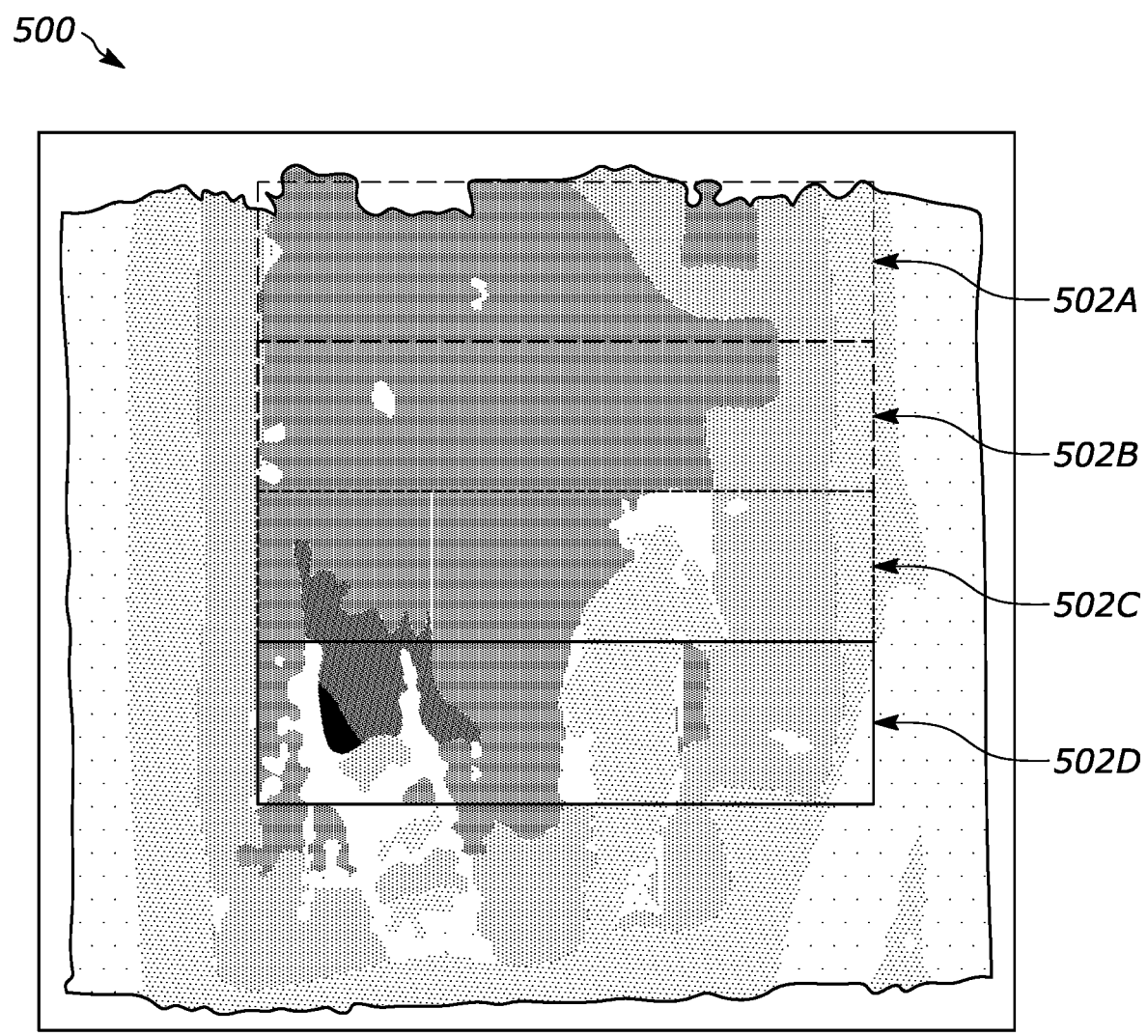
FIG. 5 depicts a point cloud representation of a trailer interior with identified horizontal sections, in accordance with embodiments described herein.

The method 400 may also include calculating a normalized height of the respective region (block 418). Generally, the processors may calculate the normalized height of a region as a series of percentages representing the utilization of multiple horizontal subsections of the region. For example, FIG. 5 depicts a point cloud representation 500 of a trailer interior with identified horizontal sections 502A-D, in accordance with embodiments described herein. Each of the identified horizontal sections 502A-D may represent one quarter of the total vertical area of a respective region within the trailer. Of course, it should be understood that any suitable number of sections may be used, and the sections may be of any suitable size, proportion relative to each other, and/or shape.

With continued reference to FIG. 5, the processors may analyze the point cloud data included in the composite point cloud representation of the respective region for the horizontal section 502A to determine what gaps exist within that section 502A of the respective region. The processors may identify these gaps and thereafter calculate the size of the gaps within the section 502A to determine what percentage of the section 502A is utilized for the respective region. For example, the processors may identify a gap in the top right corner of the horizontal section 502A because the depth values of the point cloud data included in the composite point cloud representation of the respective region for the top right corner of the horizontal section 502A are greater than the front depth value of the respective region. In this example, the processors may then calculate a volume of the identified gap in the top right corner, and may compare that gap volume to the volume of the entire horizontal section 502A of the respective region to determine the percentage utilization of the horizontal section 502A of the respective region. The processors may perform similar analysis with respect to each horizontal region 502A-D of each respective region within the trailer to determine the normalized height of each respective region.

In certain aspects, the processors may calculate the normalized height of the respective region by segmenting the respective region into a plurality of horizontal sections that each have a respective horizontal section height, wherein each gap present in the respective region has a respective gap dimension. The processors may then subtract each respective gap dimension that corresponds to a respective gap included within a respective horizontal section from the corresponding respective horizontal section height to calculate a normalized horizontal section height. Each normalized horizontal section height corresponding to a respective region may then be added together to calculate the normalized height of the respective region.

Figure 6A:
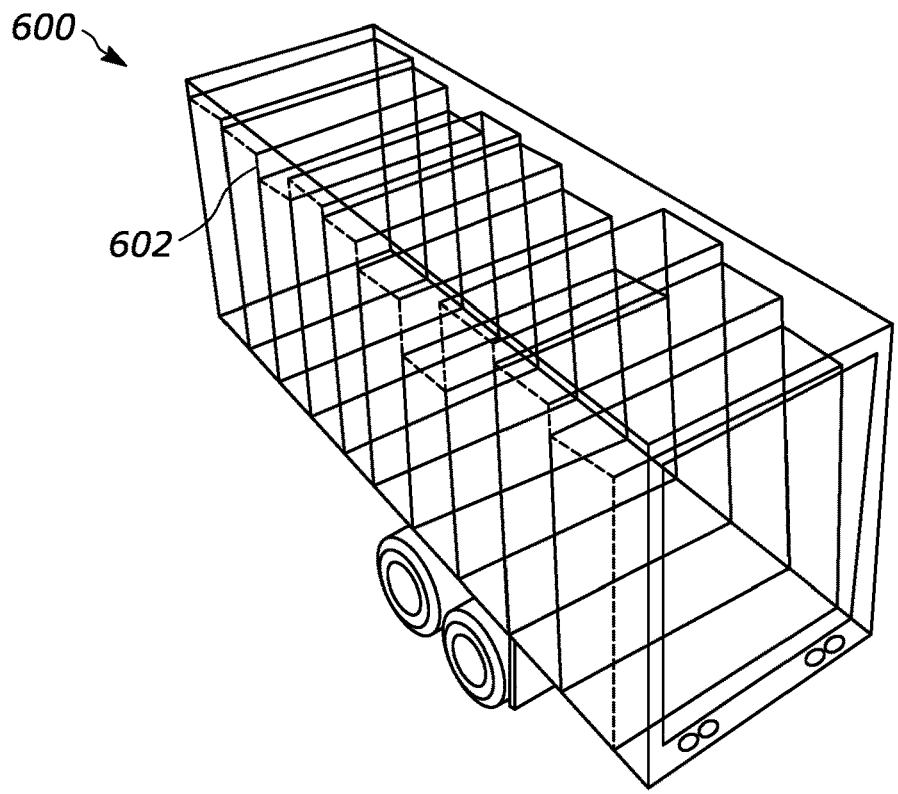
FIG. 6A illustrates a loaded trailer graphic with multiple regions of various heights, in accordance with embodiments described herein.

The method 400 also includes creating a 3D model visualization of the trailer depicting trailer utilization (block 420). Generally, the 3D model visualization may be in any suitable display format, and may include any suitable visualizations intended to display the trailer utilization. For example, FIG. 6A illustrates a loaded trailer graphic 600 with multiple regions 602 of various heights, in accordance with embodiments described herein. As illustrated in FIG. 6A, the loaded trailer graphic 600 may include a transparent or x-ray view of the trailer interior, such that a user viewing the loaded trailer graphic 600 may quickly and readily gather a rough understanding of the overall trailer utilization. The loaded trailer graphic 600 may be displayed to a user on a user interface of a device (e.g., client device 204).

The multiple regions 602 provide a generalized representation (e.g., rectangular prisms) of the trailer utilization at each respective region based on the normalized height and the composite point cloud of each respective region. For example, a first region of the multiple regions 602 may include a relatively short-normalized height as a result of a high number of gaps present in the composite point cloud of the first region. Thus, the first region may be represented within the multiple regions 602 as a rectangular prism with a shorter height than other regions with fewer gaps in their respective composite point clouds.

Figure 6B:
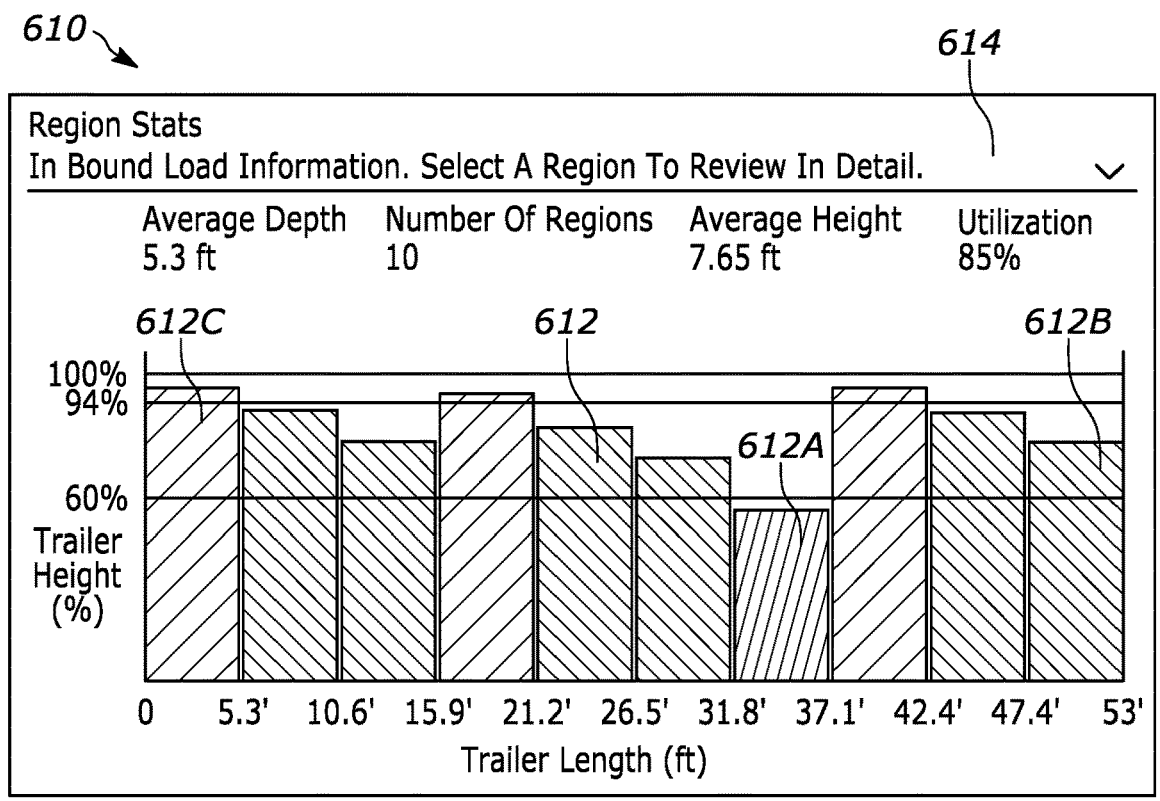
FIG. 6B is an example trailer utilization interface based on the loaded trailer of FIG. 6A, in accordance with embodiments described herein.

Moreover, an example trailer utilization interface 610 of FIG. 6B may be presented to a user in tandem with the trailer graphic 600 or as an individual graphic. Generally, the interface 610 may provide data corresponding to both outbound (e.g., loading) and inbound (e.g., unloading) load workflows. For outbound workflows, the trailer utilization interface 610 may provide multiple modes (e.g., a Parcel Mode, and a Mixed Cargo Mode) to address the different loading styles discussed with respect to FIGS. 1C and 1D.

In Parcel Mode, the trailer utilization interface 610 may include a trailer utilization graph 612 graphically illustrating to a user the utilization of each region within the trailer (e.g., trailer 102). The processors generating the interface 610, and more specifically, the graph 612 may assign height meta data to each region included in the graph 612 to color code, pattern, and/or otherwise indicate which regions are poorly filled, averagely filled, and well filled, as defined by respective thresholds. For example, if a region 612A is poorly filled/below a minimum threshold, then the bar representing that region 612B may be colored red. If a region 612B is averagely filled/between a minimum and target threshold, then the bar representing that region 612B may be colored yellow/orange. If a region 612C is well filled/above a target threshold, then the bar representing that region 612C may be colored green. Of course, all thresholds defining the poorly filled, averagely filled, and well filled regions are adjustable, and may be any suitable values. In Mixed Cargo Mode, the trailer utilization interface 610 may provide a similar graph.

Thus, in certain aspects, the processors may display, on a user interface (e.g., of client device 202), the 3D model visualization of the trailer for a user, wherein the 3D model visualization of the trailer includes a graphical rendering indicating a region within the trailer that has a corresponding trailer utilization that does not satisfy a trailer utilization threshold.

Additionally, the trailer utilization interface 610 may include a regions stats section 614 that assigns height meta data to each region similar to the heights displayed in the trailer utilization graph 612. The regions stats section 614 may provide the user with a breakdown of the average depth of freight loaded into the trailer, the number of regions, the average height of the regions, and the overall percentage utilization of the trailer. In this manner, the trailer utilization interface 610 may provide a user with a complete perspective of the overall and the regional utilization of a particular trailer.

Figure 6C:
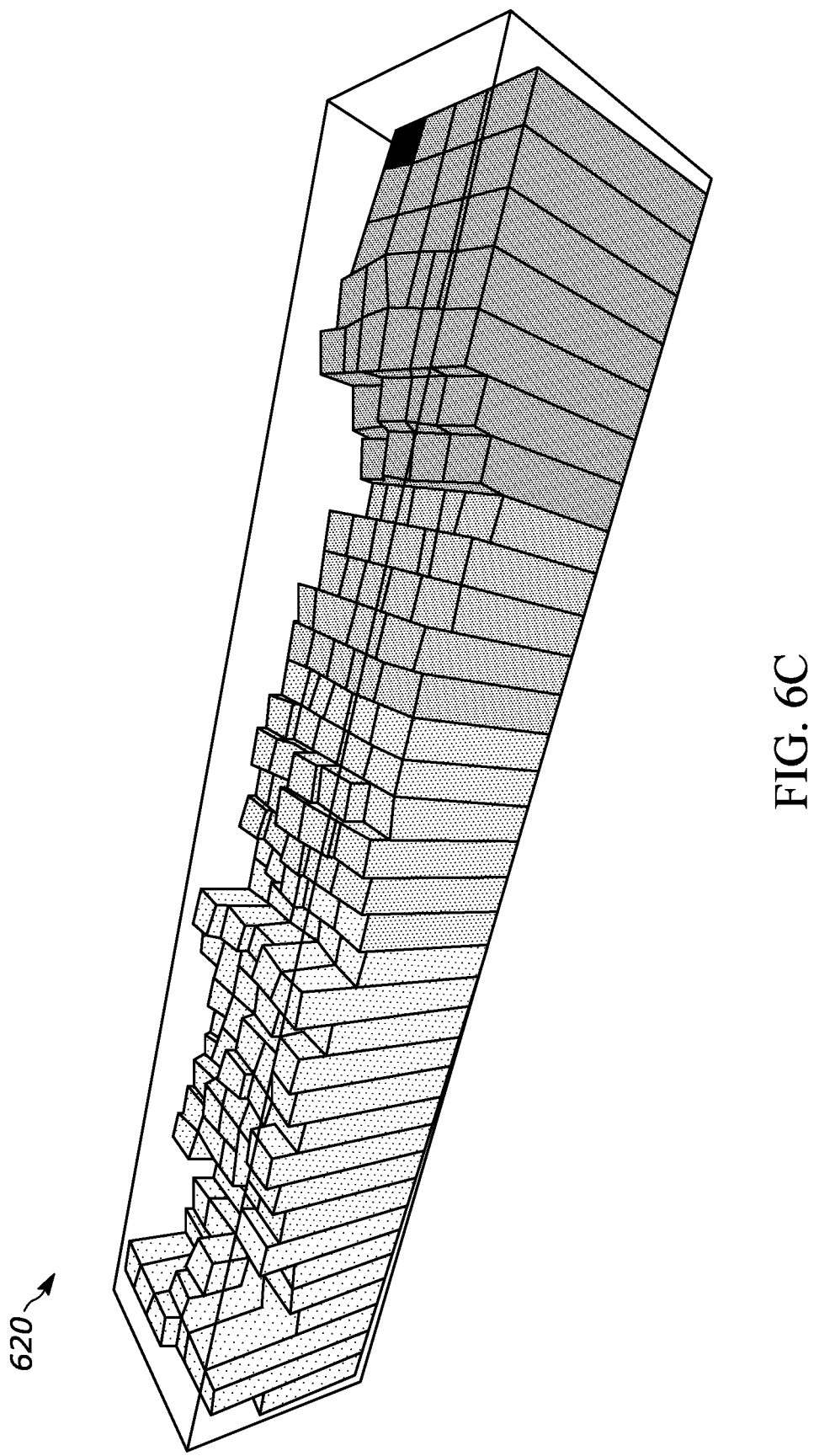
FIG. 6C is a 3D model visualization of a loaded trailer that depicts trailer utilization, in accordance with embodiments described herein.

As another example, FIG. 6C is a 3D model visualization 620 of a loaded trailer that depicts trailer utilization, in accordance with embodiments described herein. The 3D model visualization 620 may provide a more granular representation of the utilization of a trailer for viewing by a user compared to the loaded trailer graphic 600 by including more subsections of each region. Namely, as illustrated in FIG. 6C, each region of the trailer is subdivided into 5 independent subsections, each with their own height value. Thus, a user observing the 3D model visualization 620 may quickly identify specific areas within the trailer spanning multiple regions where gaps exist.

It should be understood that any of the loaded trailer graphic 600, the trailer utilization interface 610, the 3D model visualization 620, and/or any other suitable graphic or interfaces may be rendered for display to a user in order to enable the user to visualize and/or otherwise comprehend the trailer utilization of a particular trailer during outbound or inbound workflows. In this manner, the techniques of the present disclosure improve over conventional techniques by allowing a user to receive trailer utilization information corresponding to both brick wall style loads (e.g., FIG. 1C) and avalanche style loads (e.g., FIG. 1D) during both outbound and inbound workflows.

In any event, the method 400 also includes determining whether or not any regions within the trailer have yet to be processed (block 422). In the event that a region of the trailer has not yet been analyzed in accordance with the actions of the method 400 described herein (YES branch of block 422), then the method 400 may return to block 408 to analyze 3D image data points for a new region. Alternatively, if all regions of the trailer have been analyzed in accordance with the actions of the method 400 described herein (NO branch of block 422), then the method 400 may end.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above. Furthermore, the term "trailer" is an example of application of a container, in particular, a container used with a vehicle, such as a powered vehicle, like a delivery truck, box truck, etc.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for assessing trailer utilization, comprising:
capturing an image featuring a trailer, wherein the image includes a plurality of three-dimensional (3D) image data;
segmenting the image into a plurality of regions;
for each region of the plurality of regions:
cropping the image to exclude 3D image data that exceeds a respective forward distance threshold corresponding to a respective region,
iterating, using a utilization algorithm, over each 3D image data point of the cropped image to determine whether or not a matching point is included for each 3D image data point of the cropped image,
responsive to determining that a matching point is not included for a respective 3D image data point of the cropped image, adding the respective 3D image data point to the respective region,
responsive to determining that a matching point is included for a respective 3D image data point of the cropped image, adding the respective 3D image data point or the matching point to the respective region based on a position of the respective 3D image data point,
calculating a normalized height of the respective region based on whether or not a gap is present in the respective region; and
creating a 3D model visualization of the trailer that depicts trailer utilization based on the 3D image data included in each respective region and the normalized height of each respective region.

2. The method of claim 1, wherein each region of the plurality of regions is defined by a length of the trailer divided by an average box depth loaded within the trailer.

3. The method of claim 1, wherein the utilization algorithm is a K-nearest neighbor searching algorithm.

4. The method of claim 1, further comprising:
responsive to determining that a matching point is included for a respective 3D image data point of the cropped image:
determining (i) whether or not the respective 3D image data point of the cropped image is further forward than the matching point and (ii) a distance of the respective 3D image data point from a front depth of the respective region,
responsive to determining that the respective 3D image data point of the cropped image is further forward than the matching point, adding the matching point to the respective region, and
responsive to determining that (i) the respective 3D image data point of the cropped image is not further forward than the matching point and (ii) the distance of the respective 3D image data point does not exceed a front depth distance threshold, adding the respective 3D image data point to the respective region.

5. The method of claim 4, further comprising:
responsive to determining that the respective 3D image data point of the cropped image is further forward than the matching point:
   determining (i) whether or not the respective 3D image data point includes a depth coordinate less than the front depth of the respective region and (ii) whether or not the depth coordinate of the respective 3D image data point added to an average box depth loaded within the trailer is greater than the front depth of the respective region, and
   responsive to determining that the depth coordinate is less than the front depth and that the depth coordinate added to the average box depth is greater than the front depth of the respective region, designating the depth coordinate of the respective 3D image data point as equivalent to the front depth of the respective region.

6. The method of claim 1, further comprising:
calculating the normalized height of the respective region by:
   segmenting the respective region into a plurality of horizontal sections that each have a respective horizontal section height, wherein each gap present in the respective region has a respective gap dimension,
   subtracting each respective gap dimension that corresponds to a respective gap included within a respective horizontal section from the corresponding respective horizontal section height to calculate a normalized horizontal section height, and
   adding each normalized horizontal section height corresponding to a respective region together to calculate the normalized height of the respective region.

7. The method of claim 1, further comprising:
displaying, on a user interface, the 3D model visualization of the trailer for a user, wherein the 3D model visualization of the trailer includes a graphical rendering indicating a region within the trailer that has a corresponding trailer utilization that does not satisfy a trailer utilization threshold.

8. A system for assessing trailer utilization, comprising:
a housing;
an imaging assembly at least partially within the housing and configured to capture an image featuring a trailer, wherein the image includes a plurality of three-dimensional (3D) image data;
one or more processors; and
a non-transitory computer-readable memory coupled to the imaging assembly and the one or more processors, the memory storing instructions thereon that, when executed by the one or more processors, cause the one or more processors to:
   segment the image into a plurality of regions,
   for each region of the plurality of regions:
      crop the image to exclude 3D image data that exceeds a respective forward distance threshold corresponding to a respective region,
      iterate, using a utilization algorithm, over each 3D image data point of the cropped image to determine whether or not a matching point is included for each 3D image data point of the cropped image,
      responsive to determining that a matching point is not included for a respective 3D image data point of the cropped image, add the respective 3D image data point to the respective region,
      responsive to determining that a matching point is included for a respective 3D image data point of the cropped image, add the respective 3D image data point or the matching point to the respective region based on a position of the respective 3D image data point,
   calculate a normalized height of the respective region based on whether or not a gap is present in the respective region, and
   create a 3D model visualization of the trailer that depicts trailer utilization based on the 3D image data included in each respective region and the normalized height of each respective region.

9. The system of claim 8, wherein each region of the plurality of regions is defined by a length of the trailer divided by an average box depth loaded within the trailer.

10. The system of claim 8, wherein the utilization algorithm is a K-nearest neighbor searching algorithm.

11. The system of claim 8, wherein the instructions, when executed, further cause the one or more processors to:
responsive to determining that a matching point is included for a respective 3D image data point of the cropped image:
   determine (i) whether or not the respective 3D image data point of the cropped image is further forward than the matching point and (ii) a distance of the respective 3D image data point from a front depth of the respective region,
   responsive to determining that the respective 3D image data point of the cropped image is further forward than the matching point, add the matching point to the respective region, and
   responsive to determining that (i) the respective 3D image data point of the cropped image is not further forward than the matching point and (ii) the distance of the respective 3D image data point does not exceed a front depth distance threshold, add the respective 3D image data point to the respective region.

12. The system of claim 11, wherein the instructions, when executed, further cause the one or more processors to:
responsive to determining that the respective 3D image data point of the cropped image is further forward than the matching point:
   determine (i) whether or not the respective 3D image data point includes a depth coordinate less than the front depth of the respective region and (ii) whether or not the depth coordinate of the respective 3D image data point added to an average box depth loaded within the trailer is greater than the front depth of the respective region, and
   responsive to determining that the depth coordinate is less than the front depth and that the depth coordinate added to the average box depth is greater than the front depth of the respective region, designate the depth coordinate of the respective 3D image data point as equivalent to the front depth of the respective region.

13. The system of claim 8, wherein the instructions, when executed, further cause the one or more processors to:
calculate the normalized height of the respective region by:
   segmenting the respective region into a plurality of horizontal sections that each have a respective horizontal section height, wherein each gap present in the respective region has a respective gap dimension,
subtracting each respective gap dimension that corresponds to a respective gap included within a respective horizontal section from the corresponding respective horizontal section height to calculate a normalized horizontal section height, and
adding each normalized horizontal section height corresponding to a respective region together to calculate the normalized height of the respective region.

14. The system of claim 8, wherein the instructions, when executed, further cause the one or more processors to:
cause a user interface to display the 3D model visualization of the trailer for a user, wherein the 3D model visualization of the trailer includes a graphical rendering indicating a region within the trailer that has a corresponding trailer utilization that does not satisfy a trailer utilization threshold.

15. A tangible machine-readable medium comprising instructions for assessing trailer utilization that, when executed, cause a machine to at least:
capture an image featuring a trailer, wherein the image includes a plurality of three-dimensional (3D) image data;
segment the image into a plurality of regions;
for each region of the plurality of regions:
crop the image to exclude 3D image data that exceeds a respective forward distance threshold corresponding to a respective region,
iterate, using a utilization algorithm, over each 3D image data point of the cropped image to determine whether or not a matching point is included for each 3D image data point of the cropped image,
responsive to determining that a matching point is not included for a respective 3D image data point of the cropped image, add the respective 3D image data point to the respective region,
responsive to determining that a matching point is included for a respective 3D image data point of the cropped image, add the respective 3D image data point or the matching point to the respective region based on a position of the respective 3D image data point,
calculate a normalized height of the respective region based on whether or not a gap is present in the respective region; and
create a 3D model visualization of the trailer that depicts trailer utilization based on the 3D image data included in each respective region and the normalized height of each respective region.

16. The tangible machine-readable medium of claim 15, wherein each region of the plurality of regions is defined by a length of the trailer divided by an average box depth loaded within the trailer, and the utilization algorithm is a K-nearest neighbor searching algorithm.

17. The tangible machine-readable medium of claim 15, wherein the instructions, when executed, further cause the machine to at least:
responsive to determining that a matching point is included for a respective 3D image data point of the cropped image:
determine (i) whether or not the respective 3D image data point of the cropped image is further forward than the matching point and (ii) a distance of the respective 3D image data point from a front depth of the respective region,
responsive to determining that the respective 3D image data point of the cropped image is further forward than the matching point, add the matching point to the respective region, and
responsive to determining that (i) the respective 3D image data point of the cropped image is not further forward than the matching point and (ii) the distance of the respective 3D image data point does not exceed a front depth distance threshold, add the respective 3D image data point to the respective region.

18. The tangible machine-readable medium of claim 17, wherein the instructions, when executed, further cause the machine to at least:
responsive to determining that the respective 3D image data point of the cropped image is further forward than the matching point:
determine (i) whether or not the respective 3D image data point includes a depth coordinate less than the front depth of the respective region and (ii) whether or not the depth coordinate of the respective 3D image data point added to an average box depth loaded within the trailer is greater than the front depth of the respective region, and
responsive to determining that the depth coordinate is less than the front depth and that the depth coordinate added to the average box depth is greater than the front depth of the respective region, designate the depth coordinate of the respective 3D image data point as equivalent to the front depth of the respective region.

19. The tangible machine-readable medium of claim 15, wherein the instructions, when executed, further cause the machine to at least:
calculate the normalized height of the respective region by:
segmenting the respective region into a plurality of horizontal sections that each have a respective horizontal section height, wherein each gap present in the respective region has a respective gap dimension,
subtracting each respective gap dimension that corresponds to a respective gap included within a respective horizontal section from the corresponding respective horizontal section height to calculate a normalized horizontal section height, and
adding each normalized horizontal section height corresponding to a respective region together to calculate the normalized height of the respective region.

20. The tangible machine-readable medium of claim 15, wherein the instructions, when executed, further cause the machine to at least:
cause a user interface to display the 3D model visualization of the trailer for a user, wherein the 3D model visualization of the trailer includes a graphical rendering indicating a region within the trailer that has a corresponding trailer utilization that does not satisfy a trailer utilization threshold.

* * * * *